No. 749,052. PATENTED JAN. 5, 1904.
D. M. FRIEDT.
CURRYCOMB.
APPLICATION FILED JUNE 27, 1903.
NO MODEL.
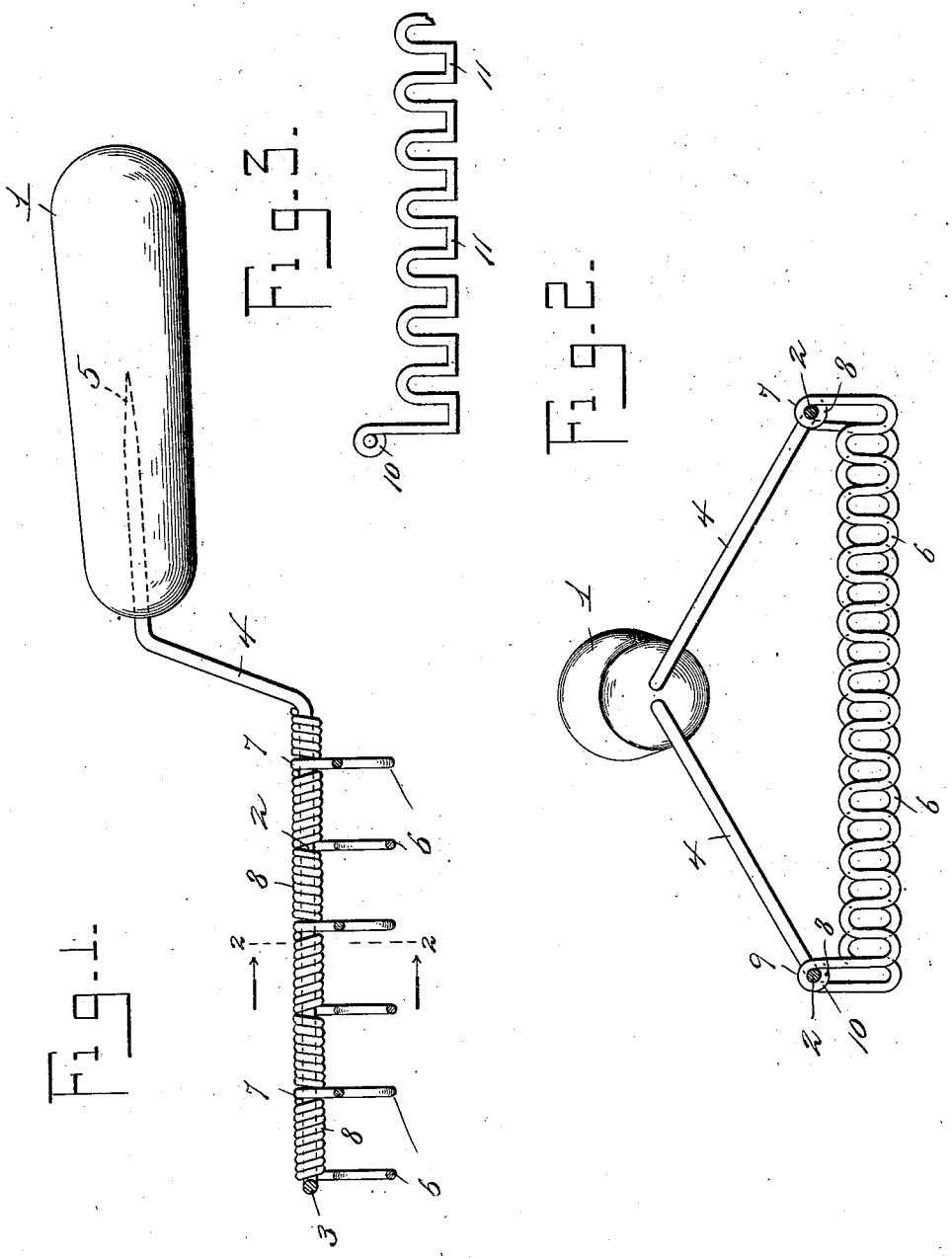
Witnesses
Harry L. Amer.
Chas. S. Hyer.
Inventor
David M. Friedt.
By Victor J. Evans
Attorney No. 749,052. Patented January 5, 1904.

UNITED STATES PATENT OFFICE.

DAVID M. FRIEDT, OF SEVILLE, OHIO.

CURRYCOMB.

SPECIFICATION forming part of Letters Patent No. 749,052, dated January 5, 1904.

Application filed June 27, 1903. Serial No. 163,392. (No model.)

*To all whom it may concern:*

Be it known that I, DAVID M. FRIEDT, a citizen of the United States, residing at Seville, in the county of Medina and State of Ohio, have invented new and useful Improvements in Currycombs, of which the following is a specification.

This invention relates to currycombs, the object in view being to provide a simple, cheap, and effective currycomb which will thoroughly scratch the hide of an animal without injuring the same and effectively clean the hair and hide and remove superfluous hair without liability of the teeth of the comb becoming clogged with dust, dirt, hair, and other material.

The construction of the currycomb is such that in case of breakage of any one or more of the rows or bars of teeth such row or bars may be removed and replaced with others, the parts of the comb being interchangeable.

With the above and other objects in view the invention consists in the novel construction, combination, and arrangement of parts, as hereinafter fully described, illustrated, and claimed.

In the accompanying drawings, Figure 1 is a central longitudinal section through a currycomb constructed in accordance with the present invention, showing the handle in elevation. Fig. 2 is a cross-section through the same, taken on the line 2 2 of Fig. 1. Fig. 3 is a detail elevation illustrating a modified form of tooth.

Like reference-numerals designate corresponding parts in all figures of the drawings.

Referring to the drawings, 1 designates a handle to which is connected the frame of the currycomb. This frame is preferably composed of a length of stout wire, the central portion of which is bent into a substantially square or rectangular frame, comprising the oppositely-arranged and substantially parallel side bars 2 and the connecting cross or end bar 3. The frame also comprises the rearwardly-converging handle-bars or shanks 4, the end portions of which are extended in substantially parallel relation and pointed, as shown at 5, and driven or otherwise inserted in the handle 1, as shown in Figs. 1 and 2.

The teeth 6 of the currycomb are formed in bars or rows, all of the teeth of one row or bar being integral or in one piece with each other, as shown in Fig. 2. Each bar or row of teeth is formed in one piece of a suitable length of wire, the wire being crimped or reversely bent, as shown in said figure, so as to make each tooth substantially semicircular or U-shaped, thus obviating the production of a sharp point which would scratch or injure the hide of the animal. The teeth of one row are also arranged to alternate or bear a staggered relation to the teeth of the adjacent rows at each side thereof, as illustrated in Fig. 2, thereby enabling each tooth to divide the bunch or hair formed by the teeth of the preceding row. In order to produce this staggered arrangement of teeth, the ends of the wire of which each row of teeth is formed are bent upward, as shown in Fig. 2, one of such end portions being offset inwardly, as shown at 7, and coiled, as shown in Fig. 1, to form a spacing-sleeve 8, which encircles one of the side bars 2 of the frame, the other end portion being offset outwardly, as shown at 9, and coiled to form the opposite sleeve 10, which encircles the other side bar 2 of the frame. In Fig. 2 two of such bars or rows of teeth are illustrated, and it will be seen that the offset sleeves 7 and 9 of one bar or row project in the opposite direction to the corresponding sleeves of the adjacent bar or row. This has the effect of throwing the teeth out of alinement and giving thereto the staggered or zigzag arrangement hereinbefore referred to. The sleeves 8 may be of any length, according to the distance required between the adjoining rows or bars of teeth, the said sleeves combined completely covering the side bars 2 from end to end, as shown in Fig. 1, and the combined sleeves being confined between the end cross-bar 3 and the converging shanks or handle-bars 4. Should one of the bars of teeth become broken, it may be removed and be replaced by another. Instead of making the teeth U-shaped or semicircular, as shown in Fig. 2, said teeth may be provided with angular corners, as shown in Fig. 3, or some of the bars may be provided with the square-shaped teeth 11, (shown in Fig. 3,) while the remaining bars may be provided with the rounded or U-shaped teeth, as shown in Fig. 2.

The comb hereinbefore described will not scratch or injure the hide of the animal upon which it is used. At the same time it will thoroughly clean the hair and hide and remove superfluous hair, and by reason of the fact that the teeth are open and arranged in zigzag or staggered form the teeth will not become clogged. The comb is easy to operate and inexpensive in manufacture.

Having thus described the invention, I claim as new—

1. A currycomb comprising an open wire frame, and a series of bars of teeth each composed of a length of wire reversely crimped or bent to form a plurality of teeth, the end portions of the wire being coiled to form spacing-sleeves which encircle the opposite side portions of the frame and hold the bars of teeth at a suitable distance apart, substantially as described.

2. A currycomb comprising an open wire frame, and a series of bars of teeth each bar being formed of a length of wire reversely crimped or bent to form a plurality of teeth, the end portions of the wire being provided with coils which are inwardly and outwardly offset, said coils forming spacing-sleeves which encircle the side bars of the frame, substantially as described.

3. A currycomb comprising an open wire frame, and a series of bars of teeth, each bar being formed of a length of wire reversely bent or crimped to form a plurality of teeth and having its ends bent to form inwardly and outwardly offset coils which constitute spacing-sleeves encircling the side bars of the frame, the coils of one bar being offset in the opposite direction to those of the adjoining bar so as to produce a staggered relation of the teeth of the comb, substantially as described.

In testimony whereof I affix my signature in presence of two witnesses.

DAVID M. FRIEDT.

Witnesses:
  LAURA M. HOLBEN,
  FRED. BECK.